US012760162B2

(12) United States Patent
Wursche et al.

(10) Patent No.: US 12,760,162 B2
(45) Date of Patent: Oct. 13, 2026

(54) PEI OR PEI-PEEK PARTICLE FOAMS FOR APPLICATIONS IN LIGHTWEIGHT CONSTRUCTION

(71) Applicant: Evonik Operations GmbH, Essen (DE)

(72) Inventors: Roland Wursche, Duelmen (DE); Christian Traßl, Warmensteinach (DE); Sebastian Geerkens, Krefeld (DE); Jörg Blaschke, Remscheid (DE); Kay Bernhard, Darmstadt (DE); Denis Holleyn, Hofheim am Taunus (DE)

(73) Assignee: Evonik Operations GmbH, Essen (DE)

( * ) Notice: Subject to any disclaimer, the term of this patent is extended or adjusted under 35 U.S.C. 154(b) by 996 days.

(21) Appl. No.: 17/995,030

(22) PCT Filed: Dec. 30, 2020

(86) PCT No.: PCT/EP2020/088033

§ 371 (c)(1),
(2) Date: Sep. 29, 2022

(87) PCT Pub. No.: WO2021/197660

PCT Pub. Date: Jul. 10, 2021

(65) Prior Publication Data

US 2023/0131319 A1 Apr. 27, 2023

(30) Foreign Application Priority Data

Apr. 3, 2020 (EP) .................................... 20167916

(51) Int. Cl.

| | |
|---|---|
| ***C08J 9/16*** | (2006.01) |
| ***C08J 9/232*** | (2006.01) |
| ***C08L 61/16*** | (2006.01) |
| ***C08L 79/08*** | (2006.01) |

(52) U.S. Cl.

CPC ................. *C08J 9/232* (2013.01); *C08J 9/16* (2013.01); *C08L 61/16* (2013.01); *C08L 79/08* (2013.01); *C08J 2371/10* (2013.01); *C08J 2379/08* (2013.01); *C08J 2471/10* (2013.01); *C08J 2479/08* (2013.01)

(58) Field of Classification Search

CPC ......................... C08J 2371/10; C08J 2471/10; C08J 2379/08; C08J 2479/08; C08J 9/16; C08J 9/18; C08J 9/232; C08J 9/0061; C08J 9/12; C08J 9/06; C08J 2471/12; C08J 2201/034; C08J 2201/03; C08J 2203/00; C08L 61/16; C08L 79/08; B29B 9/12; B29B 9/06; B29B 9/065; C08K 5/0083

See application file for complete search history.

(56) References Cited

U.S. PATENT DOCUMENTS

| | | | |
|---|---|---|---|
| 10,556,357 B2 | 2/2020 | Richter et al. | |
| 10,919,198 B2 | 2/2021 | Kraatz et al. | |
| 11,485,832 B2 | 11/2022 | Traßl et al. | |
| 11,499,028 B2 | 11/2022 | Queiroz Da Fonseca et al. | |
| 2004/0167241 A1* | 8/2004 | Scherzer | B29C 44/005 521/79 |
| 2018/0215063 A1 | 8/2018 | Richter et al. | |
| 2018/0311869 A1 | 11/2018 | Kraatz et al. | |
| 2020/0207939 A1* | 7/2020 | Traßl | B29B 9/06 |
| 2020/0325298 A1 | 10/2020 | Traßl et al. | |
| 2020/0407558 A1 | 12/2020 | Traßl et al. | |
| 2021/0095092 A1 | 4/2021 | Traßl et al. | |
| 2022/0063153 A1 | 3/2022 | Richter et al. | |
| 2022/0126490 A1 | 4/2022 | Richter et al. | |
| 2023/0105032 A1 | 4/2023 | Traßl et al. | |

FOREIGN PATENT DOCUMENTS

| | | | |
|---|---|---|---|
| CN | 101952096 | 1/2011 | |
| CN | 106750258 | 9/2019 | |
| CN | 106795313 | 12/2019 | |
| EP | 1454946 | 9/2004 | |
| EP | 3 225 654 | 10/2017 | |
| JP | 3-143933 | 6/1991 | |
| JP | 2008-303247 | 12/2008 | |
| JP | 2009-56621 | 3/2009 | |
| JP | 6166348 B2 | 7/2017 | |
| RU | 2008 130 075 | 1/2010 | |
| RU | 2 664 938 | 8/2018 | |
| RU | 2 715 527 | 2/2020 | |
| SU | 539452 | 5/2006 | |
| WO | WO 2007149418 * | 12/2007 | |
| WO | 2016/052604 A1 | 4/2016 | |
| WO | 2019/025245 | 2/2019 | |
| WO | 2019/038213 | 2/2019 | |
| WO | WO-2019038213 A1 * | 2/2019 | C08J 9/04 |

(Continued)

OTHER PUBLICATIONS

Cafiero, L. et al. "Microcellular foams from high performance miscible blends based on PEEK and PEI" European Polymer Journal 78 (2016) 116-128 (Year: 2016).*

Crevecoeur, G. et al."Binary Blends of Poly(ether ether ketone) and Poly(ether imide). Miscibility, Crystallization Behavior, and Semicrystalline Morphology" Macromolecules 1991, 24, 1190-1195 (Year: 1991).*

Chp. 12 Compounding in "Polymer Chemistry—Properties and Applications" Peacock, Andrew J.; Calhoun, Allison Hanser Publishers 2006 (Year: 2006).*

Wolf, R. et al. "Plastics, Additives" in Ullmann's Encyclopedia of Industrial Chemistry. vol. 27 pp. 619-672. 2012 Wiley-VCH Verlag GmbH & Co. KGaA. (Year: 2012).*

Traßl et al., U.S. Appl. No. 18/255,409, filed Jun. 1, 2023.

U.S. Appl. No. 18/255,409, filed Jun. 1, 2023.

(Continued)

*Primary Examiner* — Christina H. W. Rosebach

(74) *Attorney, Agent, or Firm* — Grüneberg Global IP, PLLC

(57) ABSTRACT

Polymer foams based on polyetherimides (PEI) or blends of polyetherimides and polyether ether ketone (PEEK) meet the legal requirements demanded by the aviation industry for aircraft interiors and for aircraft exteriors too.

10 Claims, No Drawings

(56) References Cited

FOREIGN PATENT DOCUMENTS

| | | |
|---|---|---|
| WO | 2019/101667 | 5/2019 |
| WO | 2019/101704 | 5/2019 |
| WO | 2022/037857 | 2/2022 |
| WO | 2022/117331 | 6/2022 |

OTHER PUBLICATIONS

International Search Report dated Feb. 8, 2021, in PCT/EP2020/088033, 5 pages.
Written Opinion dated Feb. 8, 2021, in PCT/EP2020/088033, 7 pages.
Akademik, "An Article", Dictionaries and encyclopedias on Akademik, Available at https://dic.academic.ru/dic.nsf/lower/14965 dated Mar. 10, 2013, 4 pages with English translation.
Goldmann et al., U.S. Appl. No. 18/250,824, filed Apr. 27, 2023.
U.S. Appl. No. 18/250,824, filed Apr. 27, 2023, Goldmann et al.
U.S. Pat. No. 10,556,357, Feb. 11, 2020, 2018/0215063, Richter et al.
U.S. Pat. No. 10,919,198, Feb. 16, 2021, 2018/0311869, Kraatz et al.
U.S. Appl. No. 18/003,666, filed Dec. 28, 2022, Traßl et al.
U.S. Appl. No. 16/640,626, filed Feb. 20, 2020, 2020/0207939, Traßl et al.
U.S. Appl. No. 18/063,075, filed Dec. 7, 2022, Traßl et al.
U.S. Pat. No. 11,485,832, Nov. 1, 2022, 2020/0325298, Traßl et al.
U.S. Appl. No. 16/767,240, filed May 27, 2020, 2020/0407558, Traßl et al.
U.S. Appl. No. 15/733,134, filed May 26, 2020, 2021/0095092, Traßl et al.
U.S. Appl. No. 17/423,152, filed Jul. 15, 2021, 2022/0126490, Richter et al.
U.S. Appl. No. 17/310,059, filed Jul. 14, 2021, 2022/0063153, Richter et al.
Office Action issued in Japanese Patent Application No. 2024-192887 issued Jan. 20, 2026, 7 pages, with English translation.
Japanese Office Action issued in Patent Application No. 2024-17524 on Mar. 17, 2026, 35 pages, with English translation.

* cited by examiner

PEI OR PEI-PEEK PARTICLE FOAMS FOR APPLICATIONS IN LIGHTWEIGHT CONSTRUCTION

CROSS-REFERENCE TO RELATED APPLICATIONS

This application is the National Stage entry under § 371 of International Application No. PCT/EP2020/088033, filed on Dec. 30, 2020, and which claims the benefit of priority to European Application No. 20167916.4, filed on Apr. 3, 2020. The content of each of these applications is hereby incorporated by reference in its entirety.

BACKGROUND OF THE INVENTION

Field of the Invention

Polymer mixture comprising polyetherimide and polyether ether ketone and also at least one nucleating agent for the production of foams.

Polymer foams based on blends of polyetherimides (PEI) and polyether ether ketone (PEEK) meet the legal requirements demanded by the aviation industry for aircraft interiors and for aircraft exteriors too. Specifically, the demands on fire behaviour, stability to media and mechanical properties constitute a great challenge here. According to the prior art, suitable polymer foams are produced as semifinished products. Post-processing into shaped articles is uneconomic in respect of time and material used, e.g. because of the large amounts of cutting waste. The invention solves this problem by allowing the processing into particle foam mouldings of material that is in principle suitable. These mouldings can be produced without post-processing in short cycle times and hence economically. Moreover, this gives rise to new options for functional integration, for example by direct incorporation into the foam of inserts etc., and with regard to design freedom.

Description of Related Art

Foam materials suitable for installation in the aviation industry are well known. However, the majority of the foams described for this purpose are composed of pure PMI (polymethacrylimide), PPSU (polyphenylene sulfones) or PES (polyether sulfones) only. Also found in the literature is PI (polyarylimide), although this is unsuitable from a toxicological viewpoint. All these materials have thus far been used to date exclusively as block or slab materials.

Other materials have also been described as slab material for installation in the aviation industry, but in less detail. Poly(oxy-1,4-phenylsulfonyl-1,4-phenyl) (PESU) is thus an example of one such material. This is sold for example under the Divinycell F product name by DIAB. The further processing of these extruded foam boards does, however, give rise to uneconomically large amounts of offcut material.

An economic method for avoiding cutting waste in the production of three-dimensional foam mouldings is the use of foam particles (bead foams) rather than slabstock foams. All the particle foams available according to the prior art have either drawbacks when used at high temperatures or else suboptimal mechanical properties overall, and especially at these high temperatures. Moreover, there are only very few known foams that are not highly flammable and as such can be installed e.g. in the interiors of road vehicles, rail vehicles or aircraft. For example, particle foams based on polypropylene (EPP), polystyrene (EPS), thermoplastic polyurethane elastomer (E-TPU) or PMI (ROHACELL Triple F) thus have inadequate flame retardancy, whereas all inherently flame-retardant polymers that are suitable in principle, for example PES, PEI, PEEK or PPSU, are in the current prior art processed solely into slabstock foams.

SUMMARY OF THE INVENTION

Problem

The problem addressed by the present invention in respect of the prior art was that of providing a composition for producing novel foams for use in aircraft construction. The resulting foams should have a good combination of usability at high temperatures, good mechanical properties, in particular as regards elongation at break, and at least sufficient flame-retardancy for many applications in vehicle and aircraft construction. In addition, the foam should be realizable from the composition to be developed by a wide variety of different methods and in a wide range of three-dimensional shapes and with the generation, in the production of the final component, of only very little offcut material or none at all.

Further non-explicit problems may be apparent from the description or the examples in the present text, without having been explicitly recited here for this purpose.

Solution

The problems are solved by the provision of a novel composition for producing thermally stable foam materials of low flammability for use in the aviation industry.

In particular, these problems are solved by the provision of polymer mixtures comprising polyetherimide (PEI) and polyether ether ketone (PEEK) and also at least one nucleating agent for the production of foams having a density determined in accordance with DIN EN ISO 1183 of 40 to ≤200 kg/m$^3$ and a glass transition temperature measured in accordance with DIN EN ISO 6721-1 of between 140 and 230° C.

Suitable polymer mixtures are characterized in that they contain 50% to 99.999% by weight of PEI and 0% to 49.999% by weight of PEEK, 0.001% to 2% by weight of a nucleating agent, 0% to 25% by weight of a blowing agent and 0% to 20% by weight of an additive.

Particularly suitable polymer mixtures consist of 60% to 79.999% by weight of PEI and 20% to 39.999% by weight of PEEK and 0.001% to 20% by weight of a blowing agent.

Preference is given to polymer mixtures comprising 0.1% to 17% by weight of a blowing agent.

DETAILED DESCRIPTION OF THE INVENTION

The choice of blowing agents is relatively free and for those skilled in the art is dictated in particular by the foaming method chosen, the solubility in the polymer and the foaming temperature. Suitable examples are alcohols, for example isopropanol or butanol, ketones, such as acetone or methyl ethyl ketone, alkanes, such as isobutane, n-butane, isopentane, n-pentane, hexane, heptane or octane, alkenes, for example pentene, hexene, heptene or octene, $CO_2$, $N_2$, water, ethers, for example diethyl ether, aldehydes, for example formaldehyde or propanal, hydro(chloro)fluorocarbons, chemical blowing agents or mixtures of a plurality of these substances.

The chemical blowing agents are substances of low volatility or nonvolatile substances that, under the conditions of foaming, undergo chemical decomposition to form the actual blowing agent. A very simple example thereof is tert-butanol, which forms isobutene and water under the conditions of foaming. Further examples are $NaHCO_3$, citric acid, citric acid derivatives, azodicarbonamide (ADC) and/or compounds derived therefrom, toluenesulfonylhydrazine (TSH), oxybis(benzosulfohydroazide) (OBSH) or 5-phenyltetrazole (5-PT).

In addition, foams typically comprise various additives. Depending on the nature of the additive, 0% to 20% by weight of an additive is added to the polymer mixtures. The additives are flame retardants, plasticizers, pigments, UV stabilizers, nucleating agents, impact modifiers, adhesion promoters, rheology modifiers, chain extenders, fibres, platelets and/or nanoparticles. Flame retardants used are generally phosphorus compounds, in particular phosphates, phosphines or phosphites. Suitable UV stabilizers and/or UV absorbers are common knowledge to those skilled in the art. HALS compounds, Tinuvins or triazoles are generally used for this purpose. Impact modifiers used are generally polymer particles comprising an elastomeric and/or soft/flexible phase. These are often core-(shell-)shell particles having an outer shell that as such is no more than weakly crosslinked and as pure polymer would exhibit at least a minimum miscibility with the PEI or the blends of PEI and PEEK. All known pigments are employable in principle as pigments. For relatively large amounts in particular, it is of course necessary to investigate the effect on the foaming process, as is the case for all other additives used in larger amounts greater than 0.1% by weight. This can be done with relatively little effort by those skilled in the art.

Suitable plasticizers, rheology modifiers and chain extenders are generally known to those skilled in the art from the production of sheetings, membranes or mouldings from PEI, PEEK or blends thereof, and are accordingly transferable with minimal outlay to the production of a foam from the composition according to the invention. The optionally added fibres are generally known fibrous materials that may be added to a polymer composition. In a particularly suitable embodiment of the present invention, the fibres are PEI fibres, PEEK fibres, PES fibres, PPSU fibres or blend fibres, the latter composed of a selection of the polymers mentioned.

Nanoparticles, which may be in the form e.g. of tubes, platelets, rods, spheres or other known forms, are generally inorganic materials. They may perform various functions in the finished foam at the same time. For example, these particles sometimes act as nucleating agents during foaming. In addition, the particles can influence the mechanical properties and also the (gas) diffusion properties of the foam. In addition, the particles also help make foams less flammable.

In addition to the nanoparticles mentioned, it is also possible for microparticles or sparingly miscible, phase-separating polymers to be added as nucleating agents. When considering the composition, the described polymers need to be viewed separately from the other nucleating agents, since the latter have an influence primarily on the mechanical properties of the foam, on the melt viscosity of the composition and hence on the foaming conditions. The ability of a phase-separating polymer to additionally act as a nucleating agent is an additional desired effect of this component, but not the primary effect in this case. These additional polymers are accordingly listed separately from the other additives in the overall balance further above.

These polymer mixtures are processed into foams by known processes. A customary process is extrusion. According to the invention, a foam having a density determined in accordance with DIN EN ISO 1183 of 40 to ≤200 kg/$m^3$ is produced by extrusion. Preference is given to producing blowing agent-loaded particles by underwater pelletization.

The blowing agent-loaded particles can be provided in various shapes. Advantageously, ellipsoidal particles having a mass of 0.5-15 mg, preferably between 1-12 mg, more preferably between 3 and 9 mg are produced.

Ellipsoid is the term used to describe 3-dimensional shapes based on an ellipse (2-dimensional). If the half-axes are the same, the ellipsoid is a sphere, if 2 half-axes correspond, the ellipsoid is a rotational ellipsoid (rugby ball), and if all 3 half-axes are different, the ellipsoid is triaxial.

A particularly preferred variant provides a process for producing a particle foam in which a composition consisting of 50% to 99.999% by weight of PEI, 0% to 49.999% by weight of PEEK and 0.001% to 2% by weight of nucleating agents is compounded in an extruder by underwater pelletization or strand pelletization and processed into pellets. The pellets obtained are then swelled with 0.001% to 20% by weight of blowing agent, preferably 0.1-17% by weight, in a suitable container, for example in a drum, tank or reactor, and the swollen particles are separated through a sieve and dried.

The blowing agent-loaded particles obtained are prefoamed by heating. Heating is effected by IR radiation, fluid (e.g. steam), electromagnetic waves, heat conduction, convection or a combination of these methods.

Heating the blowing agent-loaded particles results in foam particles being obtained. These foam particles have a bulk density determined in accordance with DIN EN ISO 1183 of between 40 to ≤200 kg/$m^3$, preferably between 30 and 90 kg/$m^3$.

The average cell diameter of the particle foam is preferably ≤500 μm, more preferably less than 250 μm.

The size of a cell can in many cases be easily measured, for example with the aid of a microscope. This is applicable in particular when the cell wall between two cells is readily discernible.

The particle foam according to the invention, as a foamed material, has a glass transition temperature of between 140° C. and 230° C., preferably between 180 and 225° C.

Stated glass transition temperatures are according to the invention measured by DSC (differential scanning calorimetry) unless otherwise specified. Those skilled in the art are aware that DSC is sufficiently informative only when, after a first heating cycle up to a temperature that is a minimum of 25° C. above the highest glass transition or melting temperature but at least 20° C. below the lowest decomposition temperature of a material, the material sample is held at this temperature for at least 2 min. The sample is then cooled back down to a temperature that is at least 20° C. below the lowest glass transition or melting temperature to be determined, wherein the cooling rate should be not more than 20° C./min, preferably not more than 10° C./min. After a further wait time of a few minutes, the actual measurement is then carried out, in which the sample is heated to at least 20° C. above the highest melting or glass transition temperature at a heating rate of generally 10° C./min or less. The foam particles obtained are processed into mouldings by sintering the prefoamed particles with the aid of a shaping mould and an input of energy to form mouldings having a density of 40 to ≤200 kg/$m^3$.

The input of energy is effected by IR radiation, use of a suitable fluid (for example steam or hot air), heat conduction or electromagnetic waves.

Alternatively, the foam particles can be adhesive-bonded with the aid of a shaping mould and an additive.

More preferably, the particle foam produced—irrespective of the process used—is subsequently adhesive-bonded, sewn or welded to a cover material. “Welded” means here that heating the components gives rise to a cohesive connection (adhesion) between the foam core and the cover materials.

The cover material may comprise wood, metals, decorative films, composite materials, prepregs or other known materials.

For example, a foam core with thermoplastic or cross-linked cover layers may be present. The prior art discloses various processes for producing composite parts.

A preferred process for producing a composite part is characterized in that the particle foam produced according to the invention is foamed in the presence of a cover material in such a way that it is bonded thereto by means of adhesive bonding or welding.

In the process variant in which the loading with blowing agent is effected in the extruder, the blend of PEI and PEEK may also on exiting the extruder alternatively be processed with the aid of a suitable nozzle into semifinished products, optionally in combination with cover materials. Alternatively, the composition may undergo foaming with a foam injection device directly alongside moulding (foam injection moulding).

Irrespective of the variants used, it is possible for the particle foams or composite materials to be provided with inserts during foaming and/or for channels to be incorporated into the particle foam. It is also very surprising that all the required material properties that are a prerequisite for use in an aircraft interior are met by a particle foam according to the invention, just as they are by a corresponding foam in slab form. For PMI, for example, this relationship does not exist, since, in the case of this polymethacrylimide, sheet material produced from a slabstock foam meets the conditions, whereas a particle foam would not be granted approval.

It is preferable that the foams according to the invention have a degree of foaming equating to a reduction in density compared to the unfoamed material of between 1% and 98%, preferably between 50% and 97%, more preferably between 70% and 95%. The foam has a density preferably between 20 and 1000 kg/m$^3$, preferably 40 and 200 kg/m$^3$.

In addition to the particle foam according to the invention, the present invention also includes processes for the production thereof.

There are in principle two preferred methods for producing the particle foams according to the invention. In a first process variant, a composition consisting of 50% to 99.999% by weight of PEI and 0% to 49.999% by weight of PEEK, 0.001% to 2% by weight of a nucleating agent, 0.001% to 20% by weight of a blowing agent and optionally up to 20% by weight of additives is processed into foamed pellets by means of an extruder having a perforated plate. The temperatures between intake zone and screw tip are preferably within a range of between 320 and 400° C. Furthermore, there is usually no uniform temperature over this distance, but instead, for example, a gradient with rising temperature in the feed direction of the polymer melt. The temperature of the perforated plate is between 250 and 350° C. and the melt temperature on exit through the perforated plate is between 230 and 360° C. Loading with the blowing agent generally takes place in the extruder. The pellets then undergo foaming on exiting the perforated plate. The pellets thus foamed are then preferably subsequently foamed further to give a particle foam.

In one variant of this embodiment, the composition can on exiting the extruder be guided into an underwater pelletizer. This underwater pelletizer is designed to employ a combination of temperature and pressure in such a way that prevents such foaming from occurring. This method provides pellets loaded with blowing agent that may subsequently be expanded to the desired density by a renewed input of energy and/or further processed into a particle foam workpiece by optional moulding.

In a second process variant for the production of a particle foam, an appropriate composition as described for the first variant is processed by means of an extruder having a perforated plate likewise initially into pellets, but is not loaded with a blowing agent. Here too, the temperatures—which again are not necessarily uniform—between intake zone and screw tip are within a range of between 320 and 400° C. The temperature of the perforated plate is likewise between 250 and 350° C., and the melt temperature on exit through the perforated plate is between 230 and 360° C. In this case, the pellets will be subsequently loaded with a blowing agent in an autoclave such that they then contain between 0.001% and 20% by weight, preferably between 0.1% and 17% by weight, of blowing agent. The pellets loaded with blowing agent can then be foamed by expansion into a particle foam and/or by heating to a temperature exceeding 200° C.

With regard to the production of a blend of PEI and PEEK used according to the invention, preferably 50% to 99.999% by weight of PEI and 0.001% to 49.999% by weight of PEEK can in principle be used, as can the two methods described above for pure particle foams. Because of the crystallinity and high melting temperature of PEEK of around 335° C., the temperatures stated above for the individual process steps need to be adjusted by those skilled in the art in line with the exact composition of the blend, if this is intended to contain more than 25% by weight of PEEK. It can be assumed that the temperatures chosen here will tend to be somewhat higher than those for blends containing less than 25% by weight of PEEK.

As regards the actual foaming, various methods for foaming polymer compositions are known in principle to those skilled in the art that are applicable to the present composition, particularly as regards methods for thermoplastic foams. For example, the composition can be foamed at a temperature of between 150 and 250° C. and at a pressure of between 0.1 and 2 bar. The actual foaming, if it does not directly follow the extrusion, is preferably carried out at a temperature of between 180 and 230° C. in a standard pressure atmosphere.

In the variant in which loading with a blowing agent is carried out later on, a composition still without blowing agent is charged with the blowing agent in an autoclave at a temperature of e.g. between 20 and 120° C. and at a pressure of e.g. between 30 and 100 bar and subsequently foamed inside the autoclave by reducing the pressure and increasing the temperature to the foaming temperature. Alternatively, the composition charged with the blowing agent is cooled down in the autoclave and taken out of the autoclave once it has cooled down. This composition can then later on be foamed by heating it to the foaming temperature. This can also take place, for example, alongside further moulding or in combination with other elements such as inserts or cover layers.

The foams according to the invention, or the foams produced by the process according to the invention, find use in the construction of spacecraft or aircraft, in shipbuilding, rail vehicle construction or vehicle construction, especially in the interior or exterior thereof. This may include the particle foams, whether produced by processes according to the invention or not, and likewise the composite materials realized therefrom. More particularly, by virtue of their low flammability, the foams according to the invention can also be installed in the interior of said vehicles. The invention additionally likewise provides for the use of the recited materials in shipbuilding, vehicle construction or rail vehicle construction.

The particle foams based on a blend of PEI and PEEK are particularly suitable for incorporation in aircraft interiors. Besides jets or light aircraft, aircraft especially also includes helicopters or even spacecraft. Examples of installation in the interior of such an aircraft are, for example, the tablets that can be folded down on the rear side of seats in passenger aircraft, filling for a seat or an internal partition, and also, for example, in internal doors.

Particle foams based on a blend of PEI and PEEK are in addition particularly suitable for incorporation in aircraft exteriors too. The "exterior" means not just as filling in the outer skin of an aircraft, but especially also in an aircraft nose, in the tail region, in the wings, in the outside doors, in the rudders or in rotor blades.

The invention claimed is:

1. Blowing agent loaded particles produced from a polymer mixture by underwater pelletization, wherein the blowing agent-loaded particles are ellipsoidal particles having a mass of 0.5-15 mg wherein the polymer mixture comprises:

polyetherimide, polyether ether ketone, 0.001% to 25% by weight of a blowing agent, and at least one nucleating agent;

and wherein a foam produced from the polymer mixture has a density determined in accordance with DIN EN ISO 1183 of 40 to ≤200 kg/m$^3$ and a glass transition temperature measured in accordance with DIN EN ISO 6721-1 of between 140 and 230° C.

2. The particles mixture according to claim 1, wherein the polymer mixture contains:

50% to 99.998% by weight of the polyetherimide, 0.001% to 49.999% by weight of the polyether ether ketone, 0.001% to 2% by weight of the at least one nucleating agent, 0.001% to 25% by weight the blowing agent, and 0% to 20% by weight of an additive.

3. The particles according to claim 1, wherein the mixture comprises 0.001% to 20% by weight of the blowing agent.

4. The particles according to claim 1, wherein the mixture further comprises 0.1% to 10% by weight of an additive.

5. The particles according to claim 3, wherein a foam having a density of 25 to ≤100 kg/m$^3$ can be produced by extrusion of the polymer mixture.

6. A method, comprising:

loading the particles according to claim 1 in a suitable container.

7. The blowing agent-loaded particles according to claim 1, wherein the blowing agent-loaded particles are ellipsoidal particles having a mass of between 3 and 9 mg.

8. Blowing agent-loaded particles A produced from a composition consisting of:

50% to 99.998% by weight of polyetherimide,

0% to 49.999% by weight of polyether ether ketone, 0.001% to 2% by weight of a nucleating agent, 0.001% to 20% by weight of a blowing agent, and optionally, up to 20% by weight of additives, wherein the blowing agent-loaded particles are produced from the composition by underwater pelletization, and wherein the blowing agent-loaded particles are ellipsoidal particles having a mass of 0.5-15 mg.

9. A method, comprising:

producing a foam from particles obtained according to the method of claim 6, and installing the foam in an aircraft, ship, rail vehicle, or vehicle.

10. The method according to claim 9, wherein the blowing agent-loaded particles are ellipsoidal particles having a mass of between 3 and 9 mg.

* * * * *